United States Patent [19]

Tajima et al.

[11] Patent Number: 4,720,864
[45] Date of Patent: Jan. 19, 1988

[54] SPEECH RECOGNITION APPARATUS

[75] Inventors: Kiyoshi Tajima; Masayuki Iida; Hiroki Ohnishi, all of Hirakata, Japan

[73] Assignee: Sanyo Electric Co., Ltd., Osaka, Japan

[21] Appl. No.: 490,302

[22] Filed: May 2, 1983

[30] Foreign Application Priority Data

May 4, 1982 [JP] Japan ................................ 57-74932
Jun. 22, 1982 [JP] Japan .............................. 57-107871
Feb. 14, 1983 [JP] Japan ................................ 58-22535
Feb. 14, 1983 [JP] Japan ................................ 58-22536

[51] Int. Cl.$^4$ ............................................. G10L 5/00
[52] U.S. Cl. .................................. 381/43; 364/513.5
[58] Field of Search ..................... 381/41, 42, 43, 44, 381/45, 46, 47, 48, 49, 50, 36-40; 364/513, 513.5, 200, 900; 382/16, 17, 10, 34

[56] References Cited

U.S. PATENT DOCUMENTS 4,256,924 3/1981 Sakoe .................................. 381/43
4,513,436 4/1985 Nose et al. ........................... 381/43

FOREIGN PATENT DOCUMENTS 0083509 7/1983 European Pat. Off. .............. 381/43

OTHER PUBLICATIONS

Radio Shack Dictionary of Electronics, Rudolf F. Graf, Tandy Corp. Co., 1978, p. 369.
Sakoe et al, "Dynamic Programming Algorithm Optimization for Spoken Word Word Recognition," IEEE Trans. Acoust., Speech, and Signal Process, vol. ASSO-26, pp. 43-49, Feb. 1978.

Primary Examiner—Emanuel S. Kemeny
Attorney, Agent, or Firm—Burns, Doane, Swecker & Mathis

[57] ABSTRACT

This invention relates to a speech recognition apparatus for raising the recognition speed, which is provided with first and second processors, the first processor mainly carrying out feature extraction of the input speech, the second one mainly carrying out comparison and distinction of feature extraction patterns with and from the reference patterns, thereby processing the feature extraction hand comparison and distinction in an equilibrium manner and expecting the speech recognition at high speed. Another apparatus has been proposed which allows the first processor to carry out the comparison and distinction process in parts, thereby raising the recognition rate and performing the recognition at further high speed.

15 Claims, 11 Drawing Figures

SPEECH RECOGNITION APPARATUS

BACKGROUND OF THE INVENTION

1. Field of the Invention

This invention relates to a speech recognition apparatus used for the input of command and data by the human voice.

2. Description of the Prior Art

A speech recognition apparatus has recently been developed which serves to function as the interface between the human and the machinery. The time period necessary for speech recognition becomes a problem in practical use of a system controlling the machine by the human voice. It has been proposed for diminution of the above time period to use high-speed arithmetical elements, such as a microprocessor of high computing speed or a memory of high access speed, whereby the research for improvement has conventionally been directed to attaining the above purpose. Such high-speed arithmetical elements, however, cannot obtain the effect of diminution to meet the manufacturing cost while its adoption is expensive, whereby some solution to the above problem has been expected.

OBJECT OF THE INVENTION

This invention has been designed under such technical background. A first object of the invention is to provide a speech recognition apparatus which uses respective processors to carry out in parallel the feature extraction processing for extracting features from speech to obtain feature patterns and the comparison and distinction processing for comparing the feature patterns with the previously stored reference pattern templates to detect the corresponding reference patterns, thereby expecting the speech recognition at high speed.

A second object of the invention is to provide a speech recognition apparatus which interposes between two processors executing the feature extraction processing and comparison and distinction processing an interface for transferring the feature patterns from one processor to the other, the interface being controlled of its transfer operation by an operation control circuit constituting each processor, thereby smoothing the coordinate operation of both the processors and expecting the speech recognition at high speed.

A third object of the invention is to provide a speech recognition apparatus which is provided at one or both processors with memories for temporarily holding the feature patterns so as to eliminate a dead time caused by mismatch of processing time of both the processors, thereby expecting the speech recognition at high speed.

A fourth object of the invention is to provide a speech recognition apparatus which lets the processor mainly performing the feature extraction to partially carry out the comparison and distinction processing so that the processing time of each processor is equalized, thereby expecting the improved rate of the recognition accuracy and the reduced response time of the speech recognition.

A fifth object of the invention is to provide a speech recognition apparatus which registers in a common memory the reference patterns used for the comparison and distinction processing by one processor mainly carrying out the feature extraction and that by the other processor, thereby expecting the reduced response time of the speech recognition.

The above and further objects and novel features of the invention will more fully be apparent from the following detailed description with the accompanying drawings.

DETAILED DESCRIPTION OF THE INVENTION

Figure 1:
FIG. 1 is a view explanatory of a schematic sequence of processing by the conventional speech recognition apparatus.

Firstly, explanation will be given on the characteristic of recognition processing by the speech recognition apparatus of the invention in comparison with that of the conventional one. FIG. 1 shows the sequence of processing by the conventional speech recognition apparatus. When speech ① to be recognized is given, the feature extraction processing is carried out following the above, a silent time required to be divided from the subsequent speech ② to be recognized is detected so as to know the input end of recognition object to be a unit and then compared with and distinguished from the preregistered reference pattern. Since the above processing is repeated sequentially in series, the conventional apparatus, even when the high-speed arithmetic elements are used, has been limited in improvement in the recognition processing speed.

Figure 2:
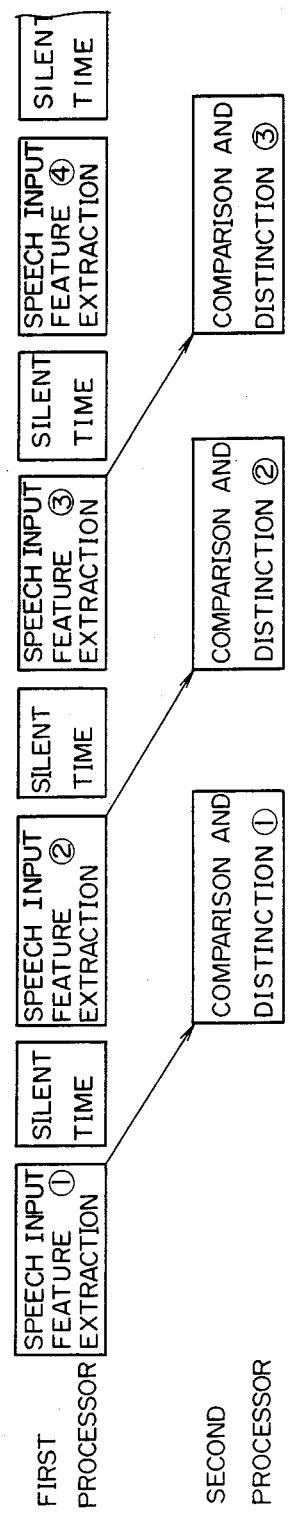
FIG. 2 is a view explanatory of the schematic sequence of processing by a speech recognition apparatus of the invention.

On the contrary, the recognition processing by the apparatus of the invention, as shown in FIG. 2, carries out in parallel the feature extraction processing by a first processor and comparison and distinction processing by a second processor. In other words, when speech ① of recognition object is given, the first processor following the input carries out the feature extraction processing, the silent time required to divide the subsequent speech ② to be recognized is detected to thereby recognize the input end of speech to be a unit, then the second processor performs the comparison and distinction processing as to speech ①, and the first processor performs in parallel the feature extraction processing of the subsequent speech ② of recognition object. Accordingly, a speaker can feed speech in succession only with a given interval of silent time without waiting the input until the result of comparison and distinction is obtained, resulting in that the recognition time period is reducible.

Figure 3:
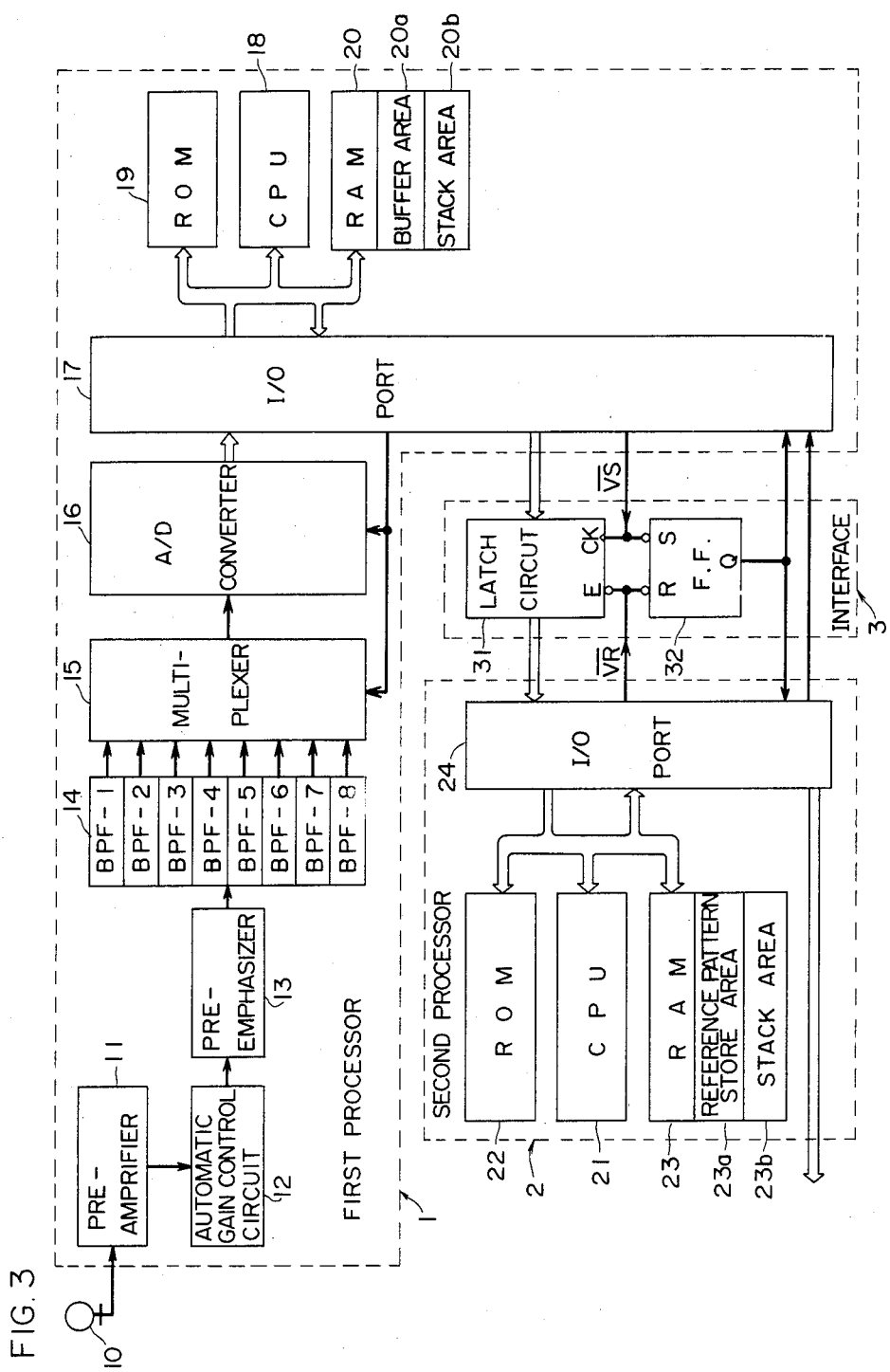
FIG. 3 is a block diagram exemplary of the speech recognition apparatus of the invention.

Next, explanation will be given concretely on the apparatus of the invention. FIG. 3 is a block diagram of a first embodiment of the invention, in which a well-known microphone 10 converts speech into an electric signal, which is given to the first processor 1. The speech fed therein at first is amplified by a pre-amplifier 11, suppressed of its amplitude by an automatic gain control circuit 12, and then fed into a pre-emphasizer 13. The pre-emphasizer 13 serves to amplify the high-frequency component and is provided to facilitate the feature extraction mainly of consonant parts in the speech. An output of a pre-emphasizer 13 is given to a filter bank 14 having 8 channel band pass filters BPF1, BPF2, ..., BPF8, each band-pass filter of which has as the pass band an area of audio frequency band of a range of, for example, 200 to 7000 HZ, divided into eight ranges and its output is given to a 8-input-1-output multiplexer 15. The multiplexer 15 sequentially selects the eight inputs from the band-pass filters by means of sampling signals given through an I/O port 17 from a CPU (Central Processing Unit) constituting the microcomputer system and outputs them to an analog/digital converter 16, which converts analogue input signals into digital signals in synchronism with the sampling signals and outputs the digital signals, the digital output signals being sent to CPU 18 through I/O port 17. In brief, the eight sampling signals can obtain, as digital data, frequency spectral values $X_1(t), X_2(t), \ldots, X_8(t)$ [t: function at the moment of sampling] at the pass bands of the respective band-pass filters BPF1, BPF2, ..., BPF8. CPU18 repeats execution of such sampling to obtain the time series data of vector parameter $X(t)$ of components $X_1(t), X_2(t), \ldots, X_8(t)$. CPU18 uses, for example, a microprocessor 8088 manufactured by Intel Co., and the microcomputer system comprises the CPU18, a ROM (Read Only Memory) 19, a RAM (Random Access Memory) 20 storing data on the way of computation by CPU18 and functioning as a buffer memory to be discussed below, and I/O port 17 functioning as the input-output interface, so that the aforesaid time series data of vector parameter is obtained following the control program in ROM19 and stored in a buffer area 20a of RAM20. In addition, collection of such time series data by the vector parameter is the same in itself as the conventional apparatus.

Figure 4:
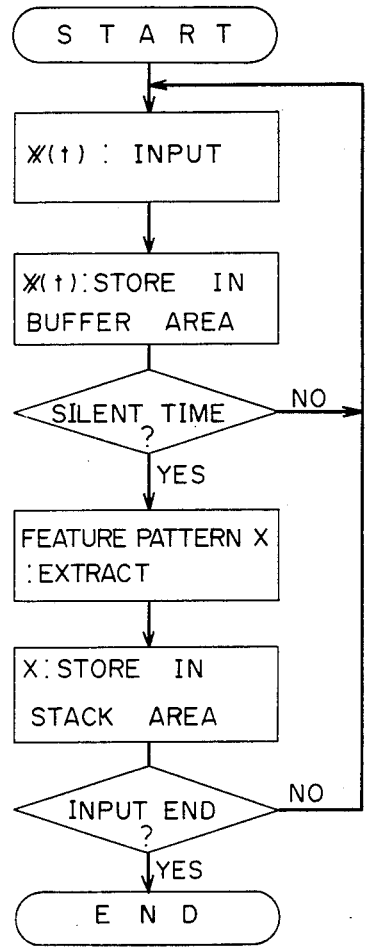
FIG. 4 is a flow chart showing a part of the content of data processing by a CPU of a first processor.

As seen from FIG. 4, in a case where an input from the A/D converter 16 is lower than the predetermined value for the predetermined time period, CPU18 decides it as the "silent time" and reads-out the time series data group of vector parameter $X$ since the preceding "silent time" as the unit of speech recognition. Then, a parameter $X(t)$, for example, at the moment of 16: $t_1, t_2, \ldots t_{16}$, is extracted in compliance with the predetermined standard and the collected data is normalized, whereby the data group given by the following equation $$X = \{X(t_1), X(t_2), \ldots, X(t_{16})\}$$

is stored as the feature patterns of the input speech into the stack area 20b of RAM20. A plurality of stack areas 20b are provided so as to store a plurality of feature patterns X of speech given in the order. The feature patterns X extracted and stored in RAM20 as the above are sent to the second processor 2 via I/O port 17 and interface 3. The second processor 2 is a microcomputer system comprising a CPU21 overall controlling the second processor 2, a ROM22 storing therein the control program of CPU21, a RAM23 storing the data on the way of computation by CPU21 and also storing the reference patterns, and an I/O port 24. Being not particularly described herein, while the apparatus is being operated in the training mode, CPU21 reads from the first processor 1 the feature patterns X extracted as the same as the aforesaid steps, and then stores them as the reference patterns $X_r$ into the reference pattern storing area of RAM23.

On the contrary, while the apparatus is being operated in the recognition mode, CPU21 adopts the feature patterns X read from RAM20 in the first processor 1 as unknown patterns X and sequentially compares said patterns with a number of reference patterns having been stored during the training mode, thereby carrying out the comparison and distinction processing for finding out the corresponding reference patterns, the content of the processing being to be discussed below.

The interface 3 comprises a latch circuit 31 for temporarily holding the data of unknown patterns and a R-S flip-flop 32 controlling the latch operation of latch circuit 31. A send-signal $\overline{VS}$ is given from the I/O port 17 of first processor 1 to the set terminal S of R-S flip-flop 32 and clock terminal CK of latch circuit 31, a receive-signal $\overline{VR}$ being given from the I/O port 24 of second processor 2 to the reset terminal R of R-S flip-flop 32 and a clear pin E of latch circuit 31, the Q output of flip-flop 32 being adapted to be given as a latch informing signal to both the processors 1 and 2.

In the state where the first processor 1 has completed feature extraction as to one or a plurality of input speeches and the unknown patterns X are stored in the stack area 20b so that the data of unknown patterns X can be sent to the second processor 2 for the comparison and distinction processing, CPU18 at first reads out the data stored in stack area 20b and puts it in condition of being sent through the I/O port 17, thereby outputting the send-signal $\overline{VS}$. Hence, the data is latched in the latch circuit 31 and simultaneously the R-S flip-flop 32 is set and the Q output has a high level and both the processors 1 and 2 are informed of read of unknown patterns X into the latch circuit 31, CPU21 in the second processor 2 receiving them and reading the data latched in the latch circuit 31 and outputting the receive-signal $\overline{VR}$ at the moment of completing read-in. Therefore, the data in the latch circuit 31 is cleared and the R-S flip-flop 32 is reset so that the Q output thereof becomes to have a low level. The CPU18 of the first processor 1 reads the data of subsequent unknown patterns X out of the stack area 20b and stands-by to send the data. In addition, the second processor 2 carries out the comparison and distinction processing as to the data read-in from the latch circuit 31, the comparison and distinction processing taking somewhat more time usually than the feature extraction processing as described hereinafter and outputting the receive-signal $\overline{VR}$ by reading the subsequent unknown patterns X corresponding to progress of comparison and distinction processing, whereby a plurality of the unknown patterns X obtained by the first processor 1 lead to being stored in the stack areas 20b for waiting the order of being read in the second processor 2.

The data, as aforesaid, is transferred in the order from the first stored one, i.e., in the method of first-in first-out (FIFO). Such transferring as aforesaid does not induce hindrance to the comparison and distinction processing, and make it possible for both processors 1 and 2 to control efficiently.

In addition, in some cases, the second processor 2 may provide a stack area 23b and an interval in the comparison and distinction processing may be utilized to allow the unknown patterns X to be saved and stored in the stack area 23b. And it may be allowed that unknown patterns X is stored in the register area of the I/O port 24. Also, the interface 3 is provided with a signal line through which a signal is sent out to reset the first processor 1 from the second processor 2.

Next, explanation will be given on the comparison and recognition processing. In the reference pattern store area 23a of RAM 23 of second processor 2 are stored the reference patterns $X_r$ as to the m number of speech recognizable by this apparatus. The reference patterns $X_r$, as abovementioned, are based on the unknown patterns X extracted by the first processor 1 and comprise 16 vector parameters, thereby being given by the following equation:

$$X_r = \{X_r(t_1), X_r(t_2) \ldots X_r(t_{16})\}.$$

Figure 5:
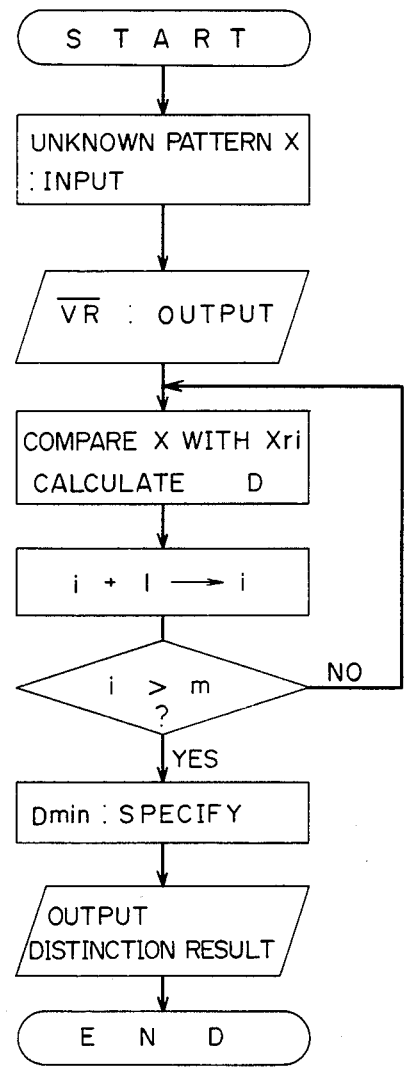
FIG. 5 is a flow chart showing a part of the content of data processing by a CPU of a second processor.

Upon reading the data of unknown patterns X through the interface 3, CPU21 compares this data in succession with the data of the m number of reference patterns $X_r$ to find the reference pattern that matches best with the unknown one and allow the input speech to correspond to said reference pattern, so that the recognition signal given to the reference pattern is output to an instrument (not shown) of the object to be controlled by the input speech. FIG. 5 is a flow chart showing the outline of the above processing. CPU21 reads the data of unknown patterns X upon receiving from the flip-flop 32 of interface 3 the Q output of high level informing the latching of data of unknown patterns X, and then outputs the receive-signal $\overline{VR}$ upon finishing reading the unknown patterns X read being compared in succession with the reference patterns $X_{ri}$ (i=1 2, ..., m). In a case of adopting, for example, the linear matching algorithm for the above comparison, the result of comparison is quantitatively decided as a distance D between corresponding patterns as shown in the following equation:

$$D = \sum_{n=1}^{16} |X_r(t_n) - X(t_n)|$$

After the distance D is obtained as to the m number of reference patterns $X_{ri}$, the minimum value D min of distance D is specified, so that assuming that there has been the input speech corresponding to the reference pattern taking the minimum value D min, the distinction signal given as to said reference pattern is output through the I/O port 24. Thus, in a case of using the apparatus of the invention, the first processor 1 mainly performs the feature extraction processing and the second one 2 mainly does the comparison and distinction processing, whereby the next input speech is received even while the comparison and distinction processing is being carried out as to the speech previously generated, thereby carrying out the feature extraction thereof, resulting in that the input speech at high speed is possible.

Now, various algorithms other than the linear matching algorithm have been well-known as to the comparison of unknown patterns X of the input speech with the reference patterns $X_r$, and a more suitable comparison algorithm is required in order to raise the rate of the recognition accuracy, one of such algorithms is well-known as the dynamic time warping or dynamic programming algorithm. Such algorithm, however, takes much time for computation while the rate of the recognition accuracy is high. Hence, when this comparison algorithm is used, the comparison and distinction processing by the second processor 2 takes fairly much time in comparison with the feature extraction processing by the first processor 1, whereby the time of both the processings is out of balance and later unknown patterns X extracted by first processor 1 overflow the stack area 20b of RAM20. Finally, the response time of the speech recognition is restricted by the time necessary, for the comparison and distinction processing, thereby not expecting the response time of the speech recognition at high speed as desired.

Figure 6:
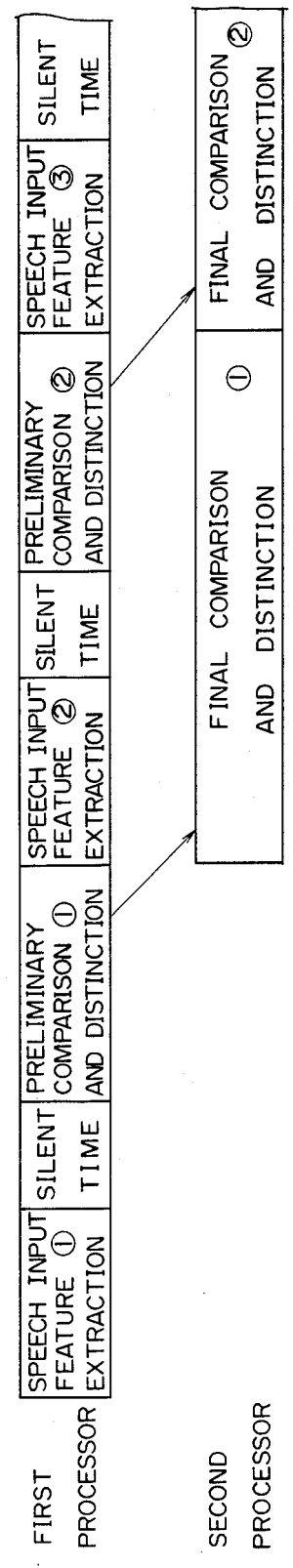
FIG. 6 is a view explanatory of the schematic sequence of processing by the speech recognition apparatus of the invention.

Accordingly, this invention will propose a speech recognition apparatus which lets the first processor carry out the comparison and distinction processing in part to balance the time period for processing at both processors 1 and 2 and which eliminates the waiting time for the input in vain, thereby expecting improvement of the rate of the recognition accuracy and the response time of the speech recognition. FIG. 6 shows the sequence of processing by the apparatus. The first processor, when speech ① is given, carries out its feature extraction and the preliminary comparison and, distinction as to the unknown pattern X of speech ① by detecting the silent time. Upon completing the comparison and distinction processing, the result thereof is transferred to the second processor. The second processor receives the result to carry out the final comparison and distinction processing as to the input speech ①, while the first processor is allowed to perform the input of the subsequent speech ② and feature extraction thereof and then the preliminary comparison and distinction processing through the silent time, which processings are carried out in order and in parallel.

Aforesaid linear matching algorithm, for example, is adopted as the preliminary comparison and distinction processing and the dynamic time warping algorithm, for example, is adopted as the final comparison and distinction processing. In the preliminary comparison and distinction processing, the distances D between the unknown pattern X and the m number of reference patterns $X_r$ are calculated respectively, so that the k number of distances of smaller value are selected, and the final comparison and distinction processing carries out the necessary computation as to the k number of the same to thereby give the reference pattern corresponding to the input speech. In brief, the dynamic time warping algorithm taking much time computes not for all the reference patterns, but only for those preselected, thereby expecting improvement in both rate of the recognition accuracy rate and the response time of the speech recognition. It is preferable to select k so that the sum of time periods for the input, feature extraction, silent time, and preliminary comparison and distinction processing by the first processor, is equal to the time period necessary for the final comparison and distinction processing by the second processor, thereby enabling the most effective use of both the processors.

Figure 7:
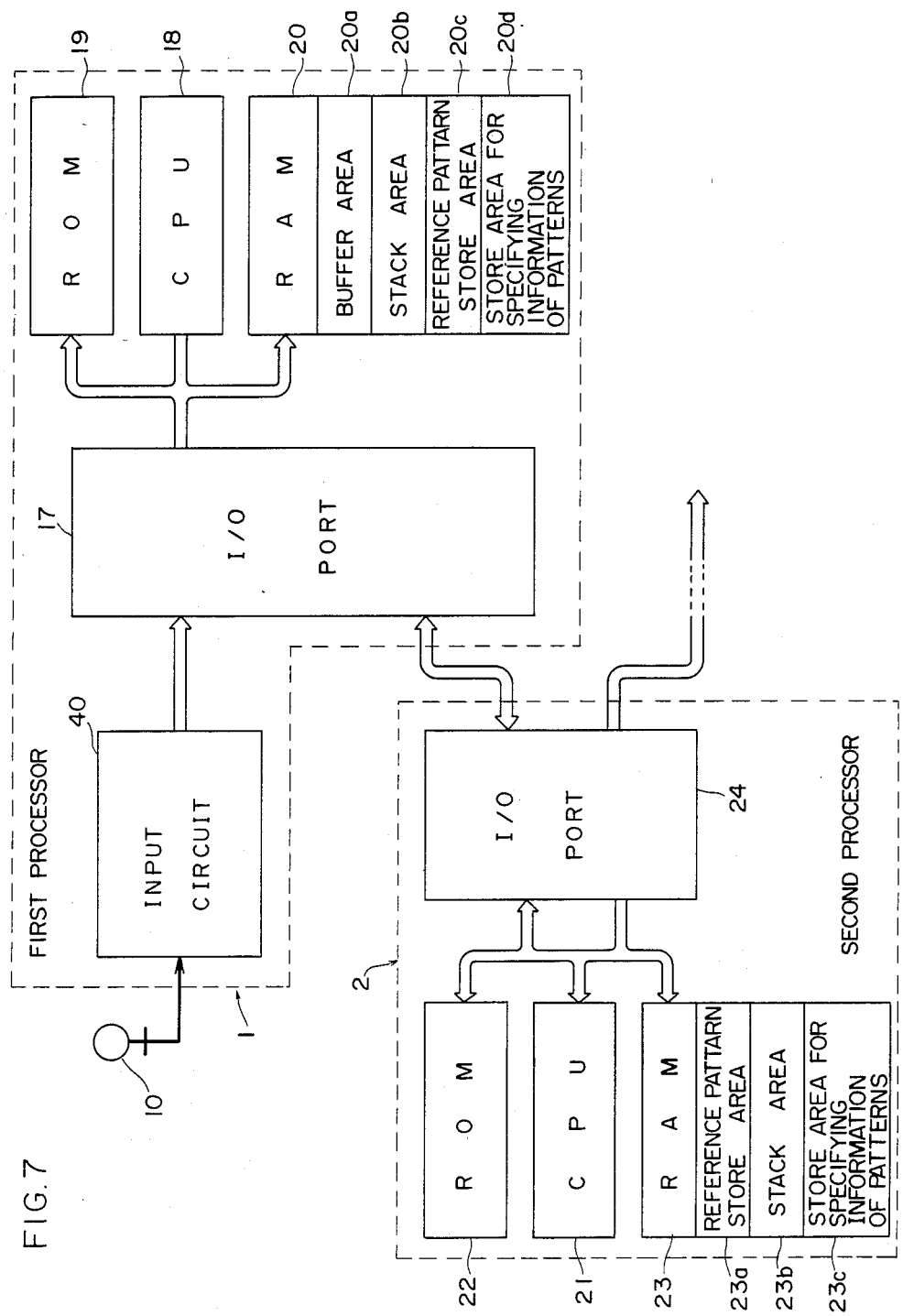
FIG. 7 is a block diagram of a modified embodiment of the speech recognition apparatus of the invention.
Figure 8:
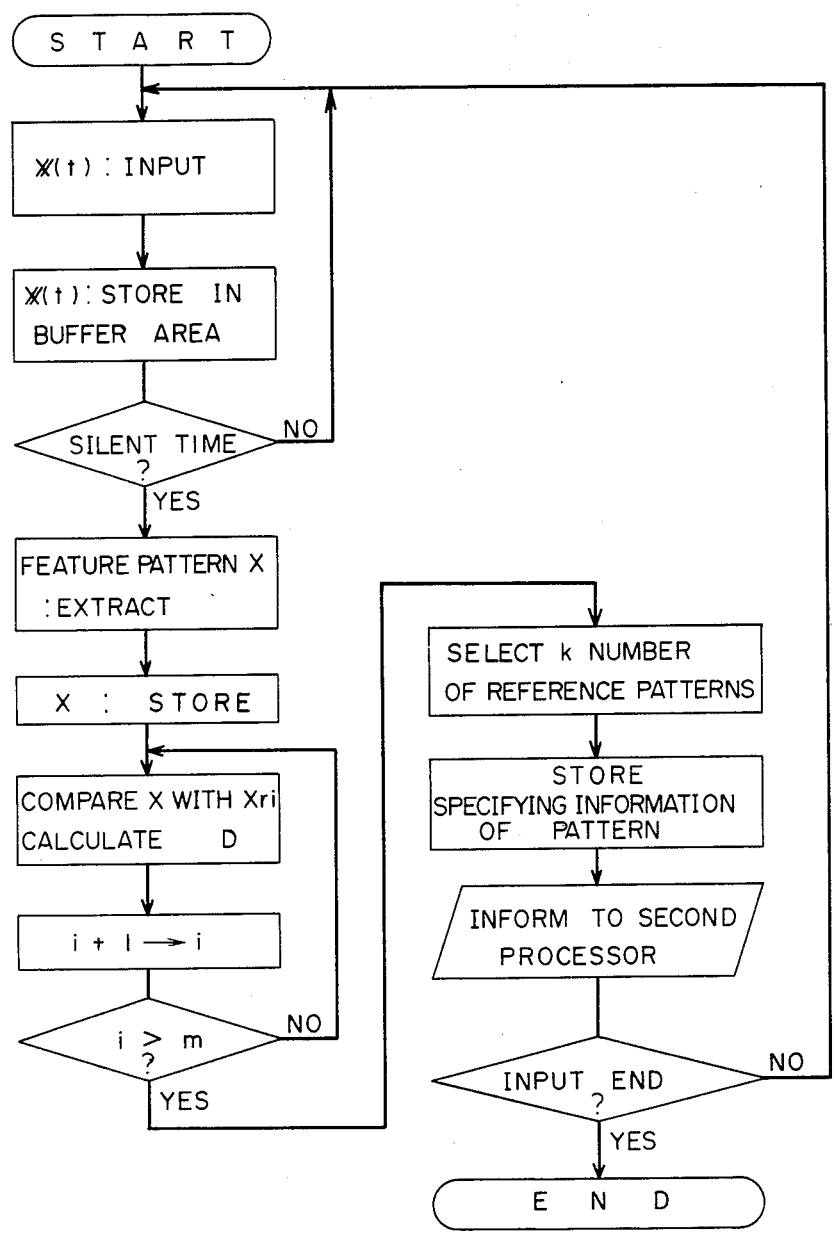
FIG. 8 is a flow chart showing a part of the content of data processing by a CPU of the first processor.

FIG. 7 is a block diagram of the apparatus of the invention for the above comparison and distinction processing, in which the speech given to a microphone 10 is converted into electrical aural signals and fed into an input circuit 40, which includes the circuit from pre-amplifier 11 to A/D converter 16 shown in FIG. 3 so that the output of A/D converter 16, i.e., vector parameter $X(t)$, is sent to CPU18 through I/O port 17. CPU18, as shown in the flow chart of FIG. 8, stores the time series data of vector parameters $X(t)$ sequentially into the buffer area 20a of RAM20, and upon detecting the silent time period, decides the input by this time as the unit of speech recognition and reads the vector parameters $X(t)$ out of the buffer area 20a to normalize the collected data and decide the feature pattern $X=\{X(t_1), X(t_2), \ldots, X(t_{16})\}$. Alternatively, the input circuit 40 may be a circuit using the Linear Predictive Coefficient for the constitution of using filter bank 14.

At this time, the feature patterns X during the training mode are stored as the reference patterns $X_r$ into the reference pattern store area 20c of RAM20, and reference pattern store area 23a of RAM23 of second processor 2, the areas 20c and 23a storing the reference patterns $X_r$ of, for example, the m number of speeches.

CPU18 during the operation in the recognition mode of the invention stores the feature patterns X in the stack area 20b and then compares the feature patterns X as the unknown patterns X with the m number of reference patterns $X_r$ stored in the reference pattern store area 20c during the preceding training mode. The comparison and distinction processing is preliminary as aforesaid to be carried out by, for example, the linear matching algorithm to thereby compute a distance D between the m number of reference patterns $X_{ri}$ (i=1 to m) and the unknown patterns X. Thus, the k number of distances D of smaller value are selected as they are similar to each other, so that in a case where the informations specifying the reference patterns $X_r$ corresponding to the distances D, for example, the same reference patterns $X_r$ in the same address, are controlled to be stored in the reference pattern store area 20c of RAM20 of the first processor 1 and reference pattern store area 23a of RAM23 of the second processor 2, the store addresses of the areas 20c and 23a of the k number of selected reference patterns $X_r$ are stored as the specified information for the corresponding reference address into a store area for specifying information of patterns 20d of RAM20, the second processor 2 being informed through I/O port 17 of completion of the preliminary comparison and distinction process. Then, CPU18 restarts read-in of vector parameter $X(t)$ with respect to the subsequent speech input.

Figure 9:
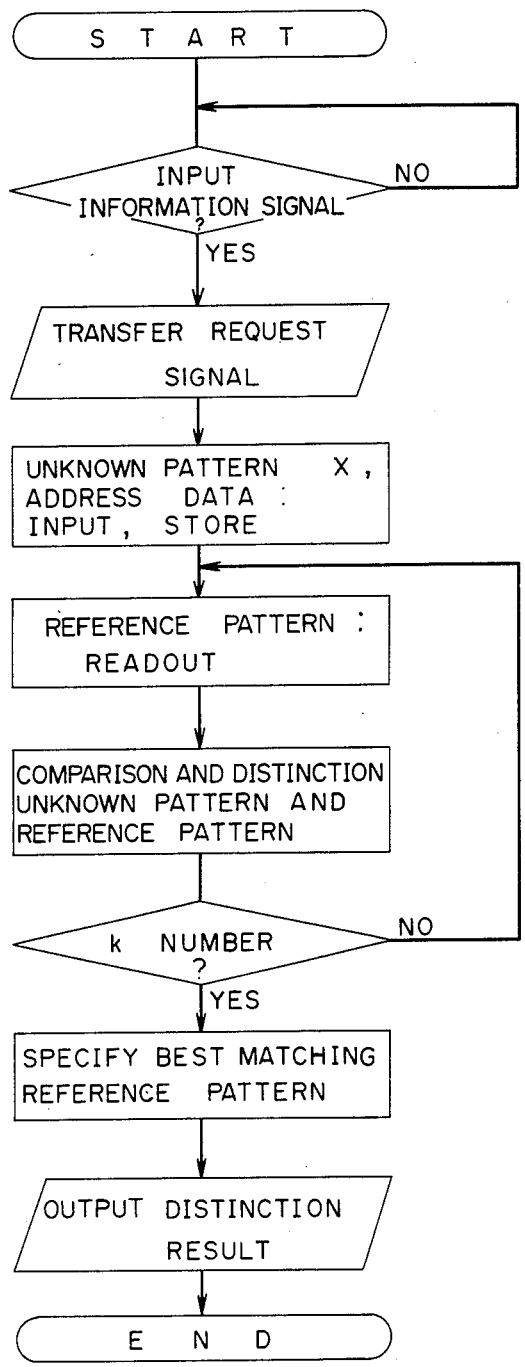
FIG. 9 is a flow chart showing a part of the content of data processing by a CPU of the second processor.

Next, explanation will be given on the processing contents of second processor 2 on the basis of the flow chart as shown in FIG. 9. Upon receiving the signal of informing the completion of the aforesaid preliminary comparison and distinction processing, CPU21 sends a data transfer request signal to the first processor 1 through its I/O port 24. Hence, CPU18 is interrupted to output to the second processor 2 through I/O port 17 the unknown patterns X stored in the stack area 20b of RAM20 and data of address of the k number of reference patterns $X_r$ stored in the store area for specifying information of patterns 20d.

Alternatively, the aforesaid interface 3 interposed between the first and second processors 1 and 2 as shown in FIG. 3 may once hold at its latch circuit the data to be transferred, i.e., data of unknown pattern X and address of the k number of preliminarily selected reference patterns $X_r$. In this case, CPUs 18 and 21 are free of waste waiting time to enable expectation of the further reduced response time of the speech recognition.

The second processor 2 reads the data sent out from the first processor 1 to store the unknown patterns X into the stack area 23b of RAM23 and similarly the address data into the store area for specifying information of patterns 23c, and then enters the step of final comparison and distinction processing on the basis of these stored data. The processing is carried out by comparing the unknown patterns X of input speech with the reference patterns $X_r$ read out from the reference pattern store area 23a of RAM23 on the basis of the address data and the same processing is executed as to the k number of reference patterns, so that, assuming that there has been the input speech corresponding to the reference pattern of the highest similarity, a recognition signal given as to said reference pattern is output through I/O port 24.

Figure 10:
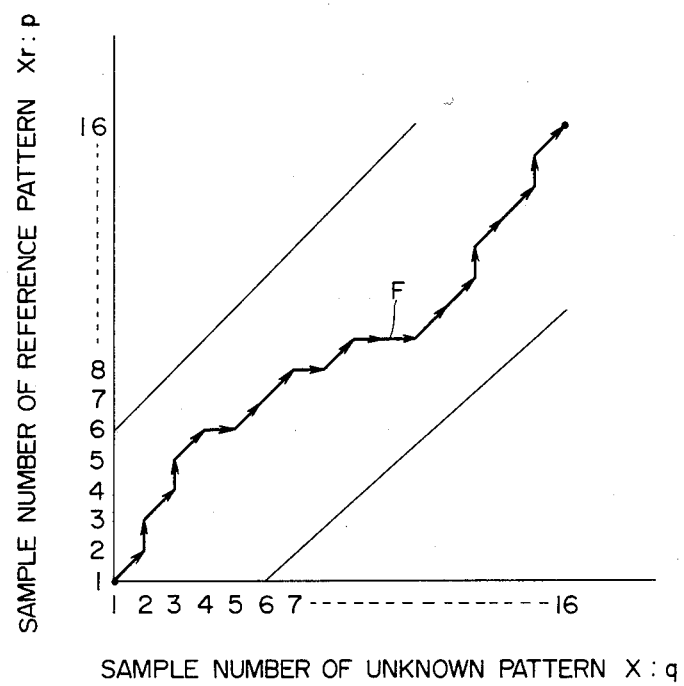
FIG. 10 is a view explanatory of the dynamic time warping algorithm.

The dynamic time warping algorithm used for the final comparison and distinction processing, as shown in FIG. 10, obtains distances in vector parameters between the unknown feature patterns X: vector parameters $X(t_1), X(t_2), \ldots, X(t_{16})$ of unknown pattern X and the vector parameters $X_r(t_1), X_r(t_2), \ldots, X_r(t_{16})$.

In other words, the distance d(p, q) between $X_r(t_p)$ and $X(tq)$ is assumed to be $d(p, q)=|X_r(tp)-X(tq)|$ and given by the asymptotic equation:

$$D(p, q) = d(p, q) + \min.\begin{cases} D(p, q-1) \\ D(p-1, q) \\ D(p-1, q-1) \end{cases}$$

where D(1,1)=d(1,1), to integrate p=1, 2, ..., 16 and q=1, 2, ..., 16 in succession, thus valuing the distances with the computed values D(16, 16). Hence, the reference pattern of the smallest computed value D(16, 16) among the k number of reference patterns $X_r$ is decided to be most similar to the unknown pattern X. In addition, the D(16, 16) corresponds to a distance from the point of (1,1) to that of (16,16) on the route F, the second term in the right side of the equation adopting the smallest value of D.

Generally, for simplification of computation, the computation is allowed to be carried out only in the limited range of the so-called window shown by, for example, $q-5<p<q+5$.

Figure 11:
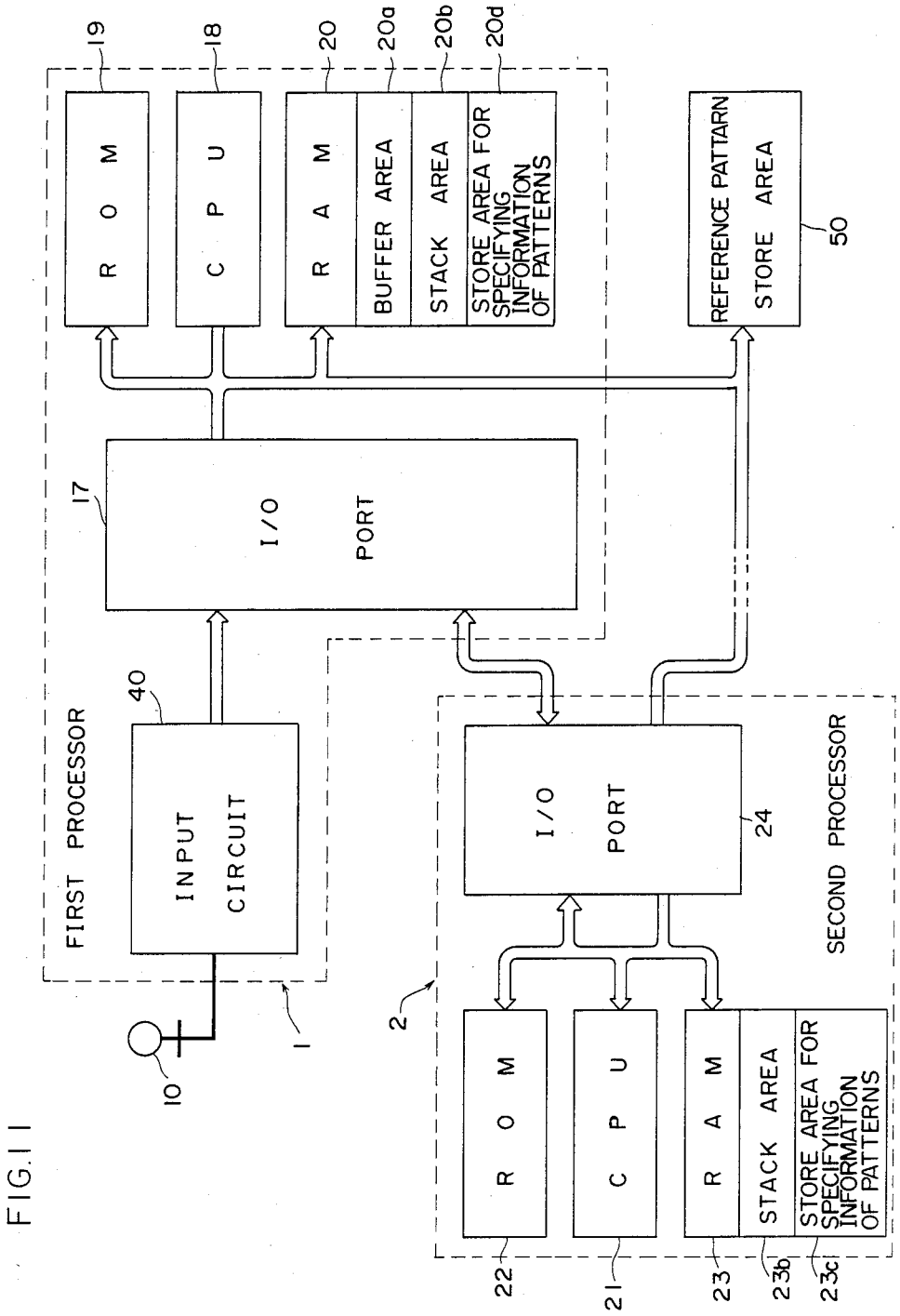
FIG. 11 is a block diagram showing another modified embodiment of the speech recognition apparatus of the invention.

Another modified embodiment of the invention is shown in FIG. 11, which is modified from the embodiment as shown in FIG. 7 and is of the same construction as that in FIG. 7 except that a memory 50 for storing the reference patterns is used in common to the first and second processors, whereby the corresponding components are designated by the same reference numerals and omitted of explanation. This embodiment is advantageous in that hardware is more saved in member in comparison with the embodiment shown in FIG. 7 providing the reference pattern store areas of RAMs of first and second processors respectively, and is convenient for use of the address writing therein the information to specify the reference patterns. In addition, access with respect to a memory 50 of course is carried out separately by each CPU 18 or 23 at the first or second processor. Alternatively, the interface 3 shown in FIG. 3 may be interposed between both the processors to thereby transfer the data of feature (unknown) pattern X and address resulting from selection of preliminary comparison and distinction processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A speech recognition apparatus comprising a microphone for converting speech into a sequence of electrical aural signals; a first processor which is provided with a first operation control circuit for computation processing to extract features of said sequence of aural signals and obtain feature patterns thereof and a first memory which is controlled by said first operation control circuit and stores said feature patterns, and which carries out feature extraction processing in sequence; a second processor which is provided with a second memory for previously storing a plurality of reference patterns and a second operation control circuit carrying out computation processing for comparing the feature patterns obtained by said first processor with said reference patterns to match each of said feature patterns to a similar reference pattern, and which carries out comparison and distinction processing in sequence; and an interface for transferring said feature patterns from the first processor to the second processor, said interface being controlled by said first and second operation control circuits, said first and second processors operating in parallel with said second processor carrying out said comparison and distinction processing for a feature pattern which has previously been extracted by said first processor while the first processor extracts features of a succeeding portion of aural signals.

2. A speech recognition apparatus as set forth in claim 1, wherein said first processor is adapted to store in said first memory said feature patterns obtained in succession with transfer of said feature patterns through said interface from the first processor to the second processor disabled, and when the second processor is ready to receive feature patterns from said first processor, said first processor transfers said feature patterns stored therein through said interface to the second processor.

3. A speech recognition apparatus as set forth in claim 1, wherein said second processor is provided with a memory in which said feature patterns transferred from said first processor are stored.

4. A speech recognition apparatus as set forth in claim 2, wherein said second processor is provided with a memory in which said feature patterns transferred from said first processor are stored.

5. A speech recognition apparatus comprising a microphone for converting speech into a sequence of electrical aural signals; a first processor carrying out feature extracting processing to extract features of said sequence of aural signals and obtain feature patterns and preliminary comparison and distinction processing in sequence for comparing said feature patterns with a plurality of reference patterns previously stored, thereby selecting a plurality of reference patterns similar to said feature patterns; a second processor carrying out final comparison and distinction processing in sequence for comparing said feature patterns obtained by said first processor with said reference patterns selected by said first processor to match said feature patterns to reference patterns which are most similar to said feature patterns; and an interface operating under control of said first and second processors for transferring said feature patterns and data related to said reference patterns selected by said first processor from said first processor to said second processor, said first and second processors operating in parallel, with said second processor carrying out said final comparison and distinction processing for the feature pattern which has previously been extracted by the first processor and the reference patterns which have previously been selected by the first processor while the first processor extracts features of a succeeding portion of aural signals and conducts preliminary comparison and distinction processing on said succeeding portion of aural signals.

6. A speech recognition apparatus as set forth in claim 5, wherein said first and second processors each include a memory in which said reference patterns are stored.

7. A speech recognition apparatus as set forth in claim 5, further including a memory separate from said first and second processors and in which said reference patterns are stored.

8. A speech recognition apparatus as set forth in claim 5, wherein the elapsed time required to carry out said feature extraction processing and preliminary comparison and distinction processing by said first processor and the elapsed time required to carry out said final comparison and distinction processing by said second processor are substantially equal.

9. A speech recognition apparatus as set forth in claim 6, wherein the elapsed time required to carry out said feature extraction processing and preliminary comparison and distinction processing by said first processor and the elapsed time required to carry out said final comparison and distinction processing by said second processor are substantially equal.

10. A speech recognition apparatus as set forth in claim 7, wherein the elapsed time required to carry out said feature extraction processing and preliminary comparison and distinction processing by said first processor and the elapsed time required to carry out said final comparison and distinction processing by said second processor are substantially equal.

11. A speech recognition apparatus as set forth in claim 1, wherein said comparison and distinction processing utilizes a linear matching algorithm.

12. A speech recognition apparatus as set forth in claim 1, wherein said comparison and distinction processing utilizes a dynamic time warping algorithm.

13. A speech recognition apparatus as set forth in claim 5, wherein said preliminary comparison and distinction processing utilizes a linear matching algorithm.

14. A speech recognition apparatus as set forth in claim 13, wherein said final comparison and distinction processing utilizes a dynamic time warping algorithm.

15. A speech recognition apparatus as set forth in claim 5, wherein said final comparison and distinction processing utilizes a dynamic time warping algorithm.

* * * * *